(12) United States Patent
Salisbury et al.

(10) Patent No.: US 9,213,660 B2
(45) Date of Patent: Dec. 15, 2015

(54) RECEIVER BASED COMMUNICATION PERMISSION TOKEN ALLOCATION

(71) Applicant: ARM Limited, Cambridge (GB)

(72) Inventors: Sean James Salisbury, Sheffield (GB); Andrew David Tune, Sheffield (GB); Alistair Crone Bruce, Sheffield (GB)

(73) Assignee: ARM Limited, Cambridge (GB)

( * ) Notice: Subject to any disclaimer, the term of this patent is extended or adjusted under 35 U.S.C. 154(b) by 370 days.

(21) Appl. No.: 13/918,025

(22) Filed: Jun. 14, 2013

(65) Prior Publication Data

US 2014/0372646 A1 Dec. 18, 2014

(51) Int. Cl.
*G06F 13/00* (2006.01)
*G06F 13/362* (2006.01)

(52) U.S. Cl.
CPC .................................. *G06F 13/362* (2013.01)

(58) Field of Classification Search
USPC .................................. 710/110; 709/208–211
See application file for complete search history.

(56) References Cited

U.S. PATENT DOCUMENTS

| | | | | |
|---|---|---|---|---|
| 4,491,946 A * | 1/1985 | Kryskow et al. | | 370/453 |
| 4,780,871 A * | 10/1988 | Arakawa | | 370/450 |
| 5,131,085 A * | 7/1992 | Eikill et al. | | 710/110 |
| 5,689,706 A * | 11/1997 | Rao et al. | | 1/1 |
| 5,835,714 A | 11/1998 | Herzl et al. | | |
| 5,960,002 A | 9/1999 | Ramfelt et al. | | |
| 6,421,751 B1 | 7/2002 | Gulick | | |
| 6,594,718 B1 | 7/2003 | Ebner et al. | | |
| 7,099,922 B2 * | 8/2006 | Pospesel et al. | | 709/208 |
| 7,203,780 B2 * | 4/2007 | Asano et al. | | 710/110 |
| 2004/0230751 A1 | 11/2004 | Blake et al. | | |
| 2005/0207755 A1 | 9/2005 | Rabbat et al. | | |
| 2005/0228900 A1 | 10/2005 | Stuart et al. | | |
| 2006/0179182 A1 | 8/2006 | Chadha et al. | | |
| 2007/0053375 A1 * | 3/2007 | Kurosawa | | 370/450 |
| 2007/0294447 A1 | 12/2007 | Nozaki et al. | | |
| 2008/0005338 A1 | 1/2008 | Yin | | |
| 2008/0008091 A1 | 1/2008 | Yumoto et al. | | |
| 2008/0162760 A1 * | 7/2008 | Jacob | | 710/244 |
| 2013/0042032 A1 | 2/2013 | Mannava et al. | | |

FOREIGN PATENT DOCUMENTS

| | | | | |
|---|---|---|---|---|
| EP | 665495 A2 * | 8/1995 | | G06F 9/46 |
| JP | 2002-182935 | 6/2002 | | |

OTHER PUBLICATIONS

"Token Ring", Wikipedia, pp. 1-7, printed on Jun. 10, 2013.
Intel, "An Introduction to the Intel® QuickPath Interconnect", (Jan. 2009), 22 pages.
Token Bus (IEEE 802.4), Technologyuk—Computer Networks, 5 pages, printed on Jun. 10, 2013.

* cited by examiner

*Primary Examiner* — Paul R Myers
(74) *Attorney, Agent, or Firm* — Nixon & Vanderhye P.C.

(57) ABSTRACT

A data processing apparatus is provided with a master device and a slave device which communicate via communication circuitry. The slave device is associated with a predetermined number of permission tokens that is equal to a maximum number of currently pending messages that can be accepted for processing from the communication circuitry by that slave device. The slave device transmits these permission tokens to the master device. The master device takes exclusive temporary possession of the permission tokens that it receives such that the permission tokens are then no longer available to any other master device. A master device initiates a message to a slave device when the master device has exclusive temporary possession of a permission token for that slave device. When the master device has initiated its message, then it relinquishes the exclusive temporary possession of the permission token such that it is then available for other devices.

19 Claims, 9 Drawing Sheets

RECEIVER BASED COMMUNICATION PERMISSION TOKEN ALLOCATION

BACKGROUND OF THE INVENTION

1. Field of the Invention

This invention relates to the field of data processing systems. More particularly, this invention relates to the control of communication between a master device and a slave device using permission tokens.

2. Description of the Prior Art

It is known to connect one or more master devices with one or more slave devices via communication circuitry that can take a variety of different forms. For example, on-chip communication may be provided by bus structures designed to provide efficient and robust communication. A problem in these systems is that it can be difficult to introduce a new slave device, or to change a slave device, without requiring significant engineering effort to reconfigure and revalidate the communication mechanisms. In particular, a slave device will typically be limited in the number of concurrently pending messages which is can accept from the communication circuitry (e.g. the number of messages it can buffer at any given time). In order that the slave device can effectively manage communication with the other devices with which it communicates, the slave device typically needs to be customised or configured to match the characteristics of those other devices, e.g. to track how many other devices have attempted to communicate with the slave device and then issue appropriate retry requests in due course. One approach would be to provide the slave device with an excess of capability for communicating with other devices, but this would be wasteful in terms of circuit area overhead and power consumption. Another approach is to customise the slave device for each situation, but this is wasteful of engineering time.

SUMMARY OF THE INVENTION

Viewed from one aspect the present invention provides apparatus for processing data, said apparatus comprising:

a master device configured to initiate messages;

a slave device configured to respond to messages received from said master device; and communication circuitry configured to provide communication of messages between said master device and said slave device; wherein said slave device is associated with a predetermined number permission tokens, said predetermined number of permission tokens being equal to a maximum number of concurrently pending messages that can be accepted for processing from said communication circuitry by said slave device under control of said permission tokens;

said slave device is configured to transmit said permission tokens to said master device via said communication circuitry;

said master device is configured to take exclusive temporary possession of a permission token received via said communication circuitry such that said permission token is no longer available for possession by any other master device;

said master device is configured to initiate a message to said slave device only when said master device has said exclusive temporary possession of said permission token; and said master device is configured to relinquish said exclusive temporary possession of said permission token after said message has been completed.

The slave device has a capability for dealing with a maximum number of concurrently pending messages that can be accepted for processing from the communication circuitry that is known when the slave device is formed. The present technique places responsibility on the slave device for issuing permission tokens to master devices in order to give those master devices permission to send a message to the slave device. A master device will be permitted to send a message to the slave device when it is in possession of one of the permission tokens for that slave device. The master devices take temporary exclusive possession of the permission tokens and relinquish them when they have completed their message.

It will be appreciated that the master devices and the slave devices could take a wide variety of different forms as will be familiar to those in the field of communication system design. For example, master devices could include a general purpose processor, a graphics processing unit, a digital signal processing unit, a DMA unit, an input/output unit etc. Slave devices could include a memory, an output device, a display controller, etc. It will also be appreciated that a given device may operate in one mode as a master device and in another mode as a slave device. Furthermore, a master device may take the form of a bridge between the communication circuitry and some other source of messages, which are passed via the master device (in the form of a bridge circuit) to the communication circuitry and then on to the slave device. All of these various possibilities for the different forms which may be taken by the master device and the slave device are encompassed within the present techniques.

In some embodiments the permission tokens may have an associated token service type and the master device may have an associated master service type. In such embodiments the master device may compare the token service type of a received permission token with its own master service type and take exclusive temporary possession of the received permission token if the master service type indicates it has appropriate type attributes relative to the token service type. Examples of service types and attributes may include classes of communication (e.g. low latency, maximum permitted latency, as possible, etc), priority levels, quality-of-service levels and the like.

In some embodiments the master device may be configured to monitor if sufficient communication capacity is being provided by the system between that master device and the slave device with which it wishes to communicate. If insufficient communication capacity is provided, then the master device may act to change its master service type to have different attributes and the service type of any permission token which it relinquishes to have different attributes. Changing its own master service type and the token service type of a permission token being released has the effect of increasing the probability that the master device will be able to regain temporary exclusive possession of that, or another, permission token at a later time. This will tend to increase the communication capacity allocated to the master device in a way that can address its shortfall in communication capacity.

In embodiments such as the above, a master device may also be configured to operate in the complementary manner to reduce its own master service type and the token service type of a permission token it is relinquishing if the master device has an excess of communication capacity allocated to it. This will have the effect of releasing communication capacity which may be usefully used by other devices.

In some embodiments the permission tokens may include a slave identifier which serves to identify a slave device to which that permission token relates. In such embodiments the master device may be configured to detect from the slave identifier of a received permission token whether or not the master device has a message it is waiting to initiate with the slave device. If the master device has a message is wishes to initiate with the slave device identified using its slave identifier, then the master device can take exclusive temporary possession of the received permission token.

It will be appreciated that the communication circuitry can take a wide variety of different forms and topologies. In some embodiments the communication circuitry may be configured to return the permission tokens issued by a slave device back to that slave device from where they can be reissued to the master device, or another master device.

In some embodiments the slave device may make use of the return of its permission tokens to control entry of that slave device into a power down state. More particularly, in some embodiments the slave device may be configured to respond to a power down request to stop reissuing its own permission tokens which are returned to it and to enter a power down state after all of its own permissions tokens have been received back. This approach ensures there are no master devices holding permission tokens for that slave and thereby avoids the slave powering down when there are still messages in progress which have not yet reached it.

As explained above, the master device may take temporary exclusive possession of a permission token from slave device. A slave device may also take temporary exclusive possession of the permission token of another slave device. In this way, a slave device can make space for its own tokens to be transmitted via the communication circuitry to the master devices. This may, for example, be useful when a particular slave would otherwise be starved of capacity on the communication circuitry. The ability of a slave device to buffer the permission tokens of other slave device(s) gives the slave device the ability to participate in the communication through use of its own tokens of its own service type.

In order to not adversely impact the different slave device for which temporary exclusive possession of its permission token has taken place, the slave device which took that temporary exclusive possession may be configured to buffer the different permission token and then transmit that different permission token to a master device at a later time. Thus, the permission token of the different slave is not destroyed, or permanently taken out of circulation, rather it is temporarily buffered to make space for the permission token of the slave which captures it.

As previously mentioned, the communication circuitry may have a wide variety of different forms. In one form the communication circuitry may include a token interconnect having a ring topology for transmitting the permission tokens with the master device and the slave device connected to different portions of the ring bus such that the permission tokens circulate around the interconnect and so reach all devices connected to the interconnect in turn. A ring topology has the advantage that the tokens will naturally pass to all connected devices in turn.

Other forms of communication circuitry may include a token star bus having a token star topology for transmitting the permission tokens from the slave device to the master device. The slave device can be configured to transmit the permission tokens in turn to all master devices connected to the star bus such that each of the master devices is given the opportunity to take temporary exclusive possession of the permission tokens of that slave device as required.

The topology of the bus or communication mechanism within the communication circuitry used to pass the messages themselves can be independent of the topology used to pass the tokens. In some embodiments, the communication circuitry may include a data ring bus having a ring topology which is used to transmit the messages in the same way as the token ring bus. However, the form of the data bus may more generally be chosen independently of the form of the topology used for transmitting the permission tokens.

It will be appreciated that at one extreme the apparatus of the present techniques could include a single slave device and a single master device. However, the advantages of management of communication and the ease of scalability of the system are greater when the apparatus includes a plurality of master devices and a plurality of slave devices.

Viewed from another aspect the present invention provides an apparatus for processing data, said apparatus comprising:
    master means for initiating messages;
    slave means for responding to messages received from said master means; and
    communication means for providing communication of messages between said master means and said slave means; wherein
    said slave means is associated with a predetermined number permission tokens, said predetermined number of permission tokens being equal to a maximum number of concurrently pending messages that can be accepted for processing from said communication means by said slave means under control of said permission tokens;
    said slave means transmits said permission tokens to said master means via said communication means;
    said master means takes exclusive temporary possession of a permission token received via said communication means such that said permission token is no longer available for possession by any other master means;
    said master means initiates a message to said slave means only when said master means has said exclusive temporary possession of said permission token; and
    said master means relinquishes said exclusive temporary possession of said permission token after said message has been completed.

Viewed from a further aspect the present invention provides a method of processing data, said method comprising the steps of:
    initiating messages with a master device;
    responding with a slave device to messages received from said master device; and
    providing communication of messages via communication circuitry between said master means and said slave means; wherein
    said slave device is associated with a predetermined number permission tokens, said predetermined number of permission tokens being equal to a maximum number of concurrently pending messages that can be accepted for processing from said communication circuitry by said slave device under control of said permission tokens;
    said slave device transmits said permission tokens to said master device via said communication circuitry;
    said master device takes exclusive temporary possession of a permission token received via said communication circuitry such that said permission token is no longer available for possession by any other master devices;
    said master device initiates a message to said slave device only when said master device has said exclusive temporary possession of said permission token; and
    said master device relinquishes said exclusive temporary possession of said permission token after said message has been completed.

The above, and other objects, features and advantages of this invention will be apparent from the following detailed description of illustrative embodiments which is to be read in connection with the accompanying drawings.

DESCRIPTION OF THE EMBODIMENTS

Figure 1:
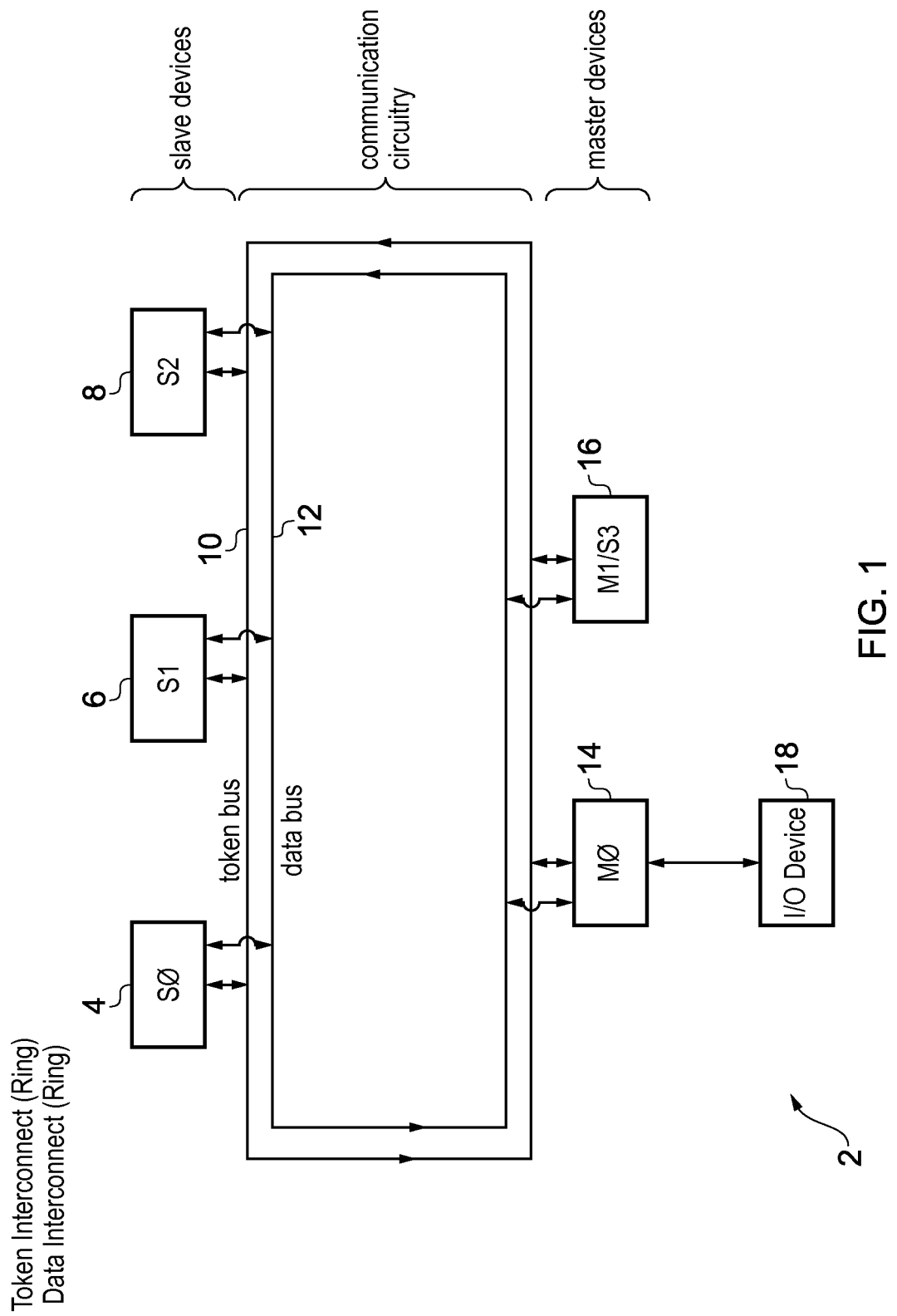
FIG. 1 schematically illustrates a first data processing apparatus including a token ring bus and a data ring bus.

FIG. 1 schematically illustrates a first example embodiment of data processing apparatus 2 including a plurality of slave devices 4, 6, 8 connected via a token ring bus 10 and a data ring bus 12 to a plurality of master devices 14, 16. In this example embodiment the master device 14 is a bridge to an input/output device 18. The input/output device 18 generates messages which are passed to the master device 14. The master device 14 is then responsible for initiating the transmission of those messages to the target slave device 4, 6, 8 when the master device 14 is in possession of a permission token indicating that the target slave device 4, 6, 8 has the capacity of accept the message if it is sent. The master device 16 in this example embodiment has a first mode of operation in which it functions as a master device and a second mode of operation in which it functions as a slave device.

Figure 2:
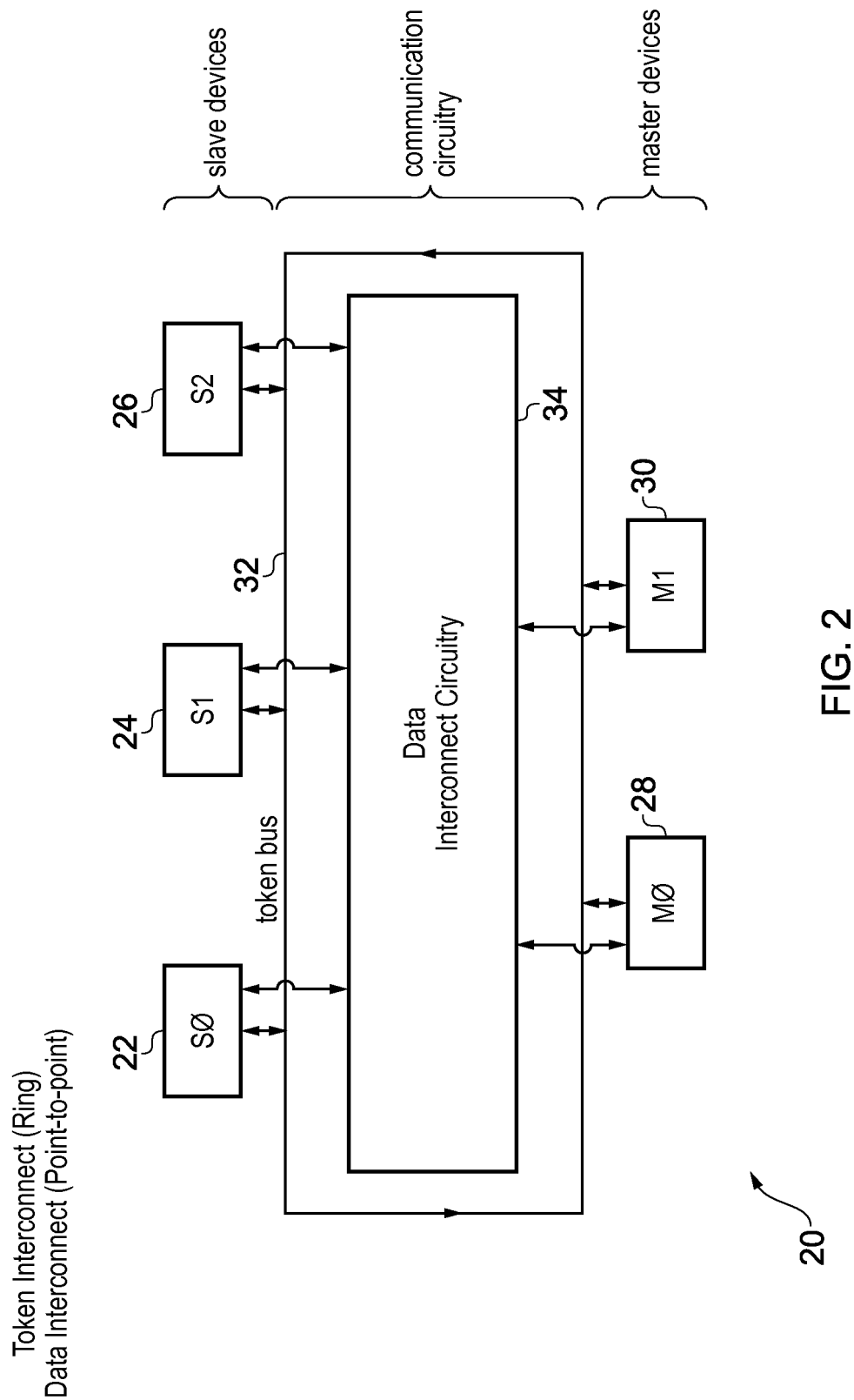
FIG. 2 schematically illustrates a second example embodiment including a token interconnect and a data interconnect.

FIG. 2 schematically illustrates a second example embodiment of a data processing apparatus 20. This data processing apparatus includes a plurality of slave devices 22, 24, 26 connected to a plurality of master devices 28, 30. Communication of permission tokens between the slave devices 22, 24, 26 and the master devices 28, 30 takes place via a token interconnect 32. Message communication when a master device is in temporary exclusive possession of a permission token for the appropriate slave device 22, 24, 26 takes place via data interconnect circuitry 34. Such data interconnect circuitry 34 may internally comprise busses, a plurality of point-to-point connections or other forms of interconnect as appropriate to the particular requirements of the data processing apparatus 20 concerned.

Figure 3:
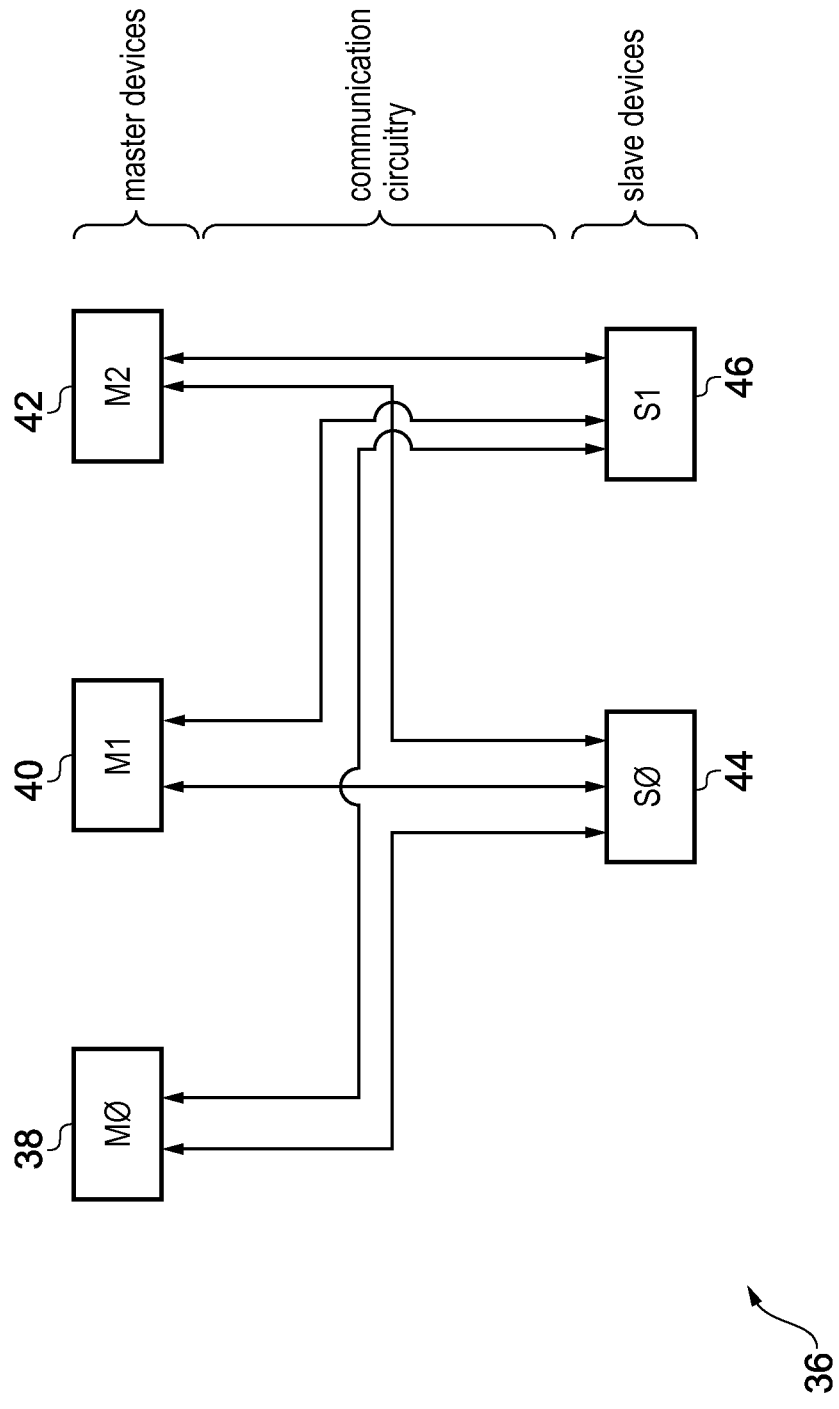
FIG. 3 schematically illustrates a third example embodiment including a plurality of master devices and a plurality of slave devices connected via a star topology with each slave device being separately connected to each of the master devices.

FIG. 3 schematically illustrates a third example embodiment of a data processing apparatus 36. This example embodiment includes a plurality of master devices 38, 40, 42 connected via communication circuitry to a plurality of slave devices 44, 46. The communication circuitry has a star topology whereby each slave device 44, 46 is provided with a point-to-point communication link with each of the master devices 38, 40, 42. In this way, each slave device 44, 46 is able to send a permission token in turn to each of the master devices 38, 40, 42. The master devices 38, 40, 42 can take temporary possession of the received permission token if they require its use. If the master devices 38, 40, 42 do not require use of the permission token at that time, then it may be returned to the originating slave device 44, 46 from where it may then be sent to the next master device 38, 40, 42 in turn.

Figure 4:
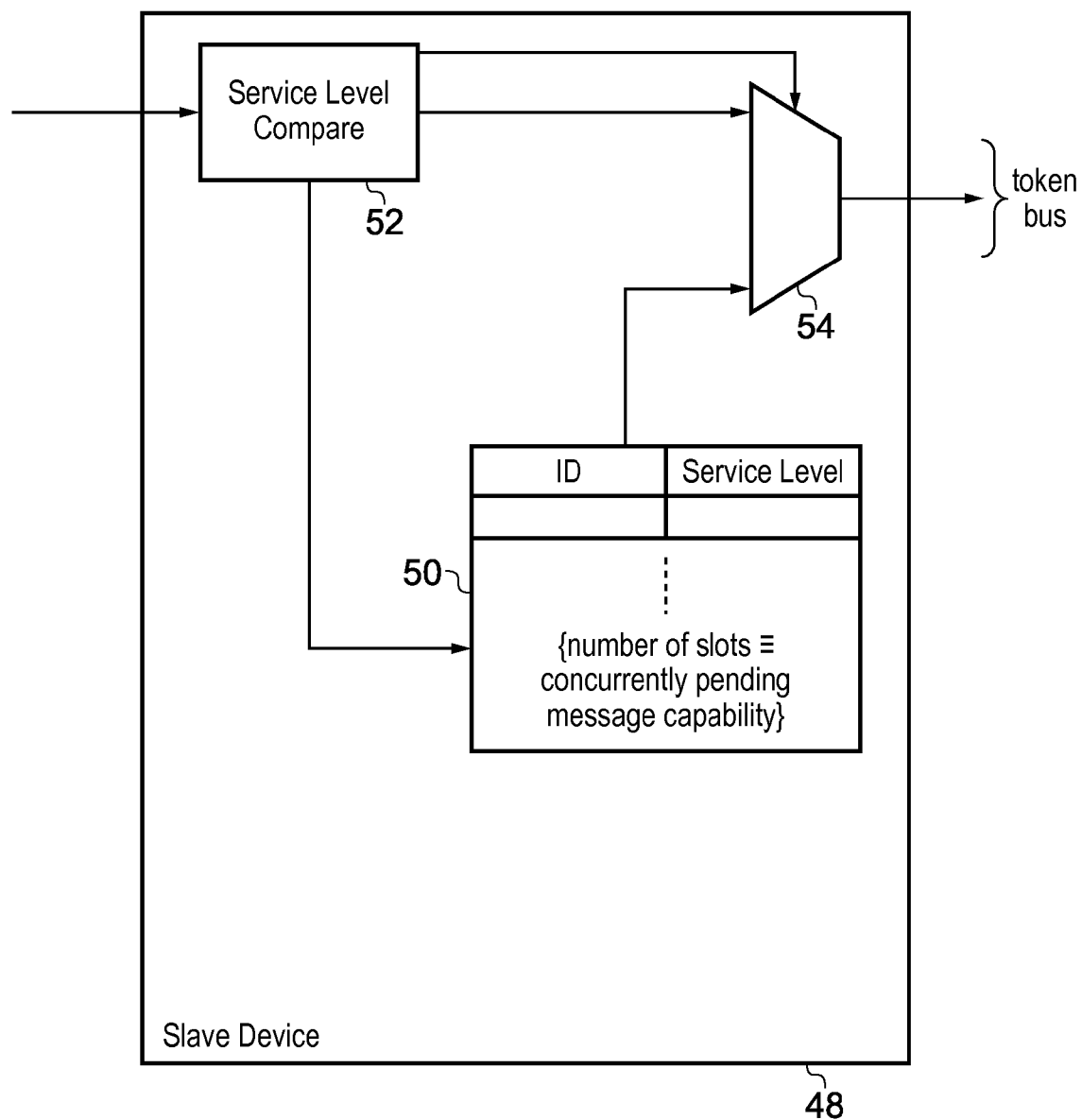
FIG. 4 schematically illustrates a slave device with circuitry for transmitting and receiving permission tokens.

FIG. 4 schematically illustrates a slave device 48 including circuitry for transmitting and receiving permission tokens. The slave device 48 includes a buffer 50 with a storage capacity sufficient to store a number of permission tokens corresponding to the maximum number of concurrently pending messages that the slave device 48 may accept for processing from the communication circuitry, such as is illustrated in any one of FIG. 1, 2 or 3. Thus, if, for example, the slave device 48 has the capability to support up to ten concurrently pending messages and accept these from the communication circuitry, then the buffer 50 will contain ten slots. These ten slots will initially at power up be populated with ten permission tokens for the slave device 48. These permission tokens will use a slave identifier ID which serves to identify the slave device 48 among a plurality of slave devices which may be connected to the communication circuitry. The permission token also includes a service type with type attributes which may correspond to one or more of a communication class, priority level, quality of service level etc. Hereafter service level will be used as an example of service type. The service level is used to provide a degree of arbitration between different masters which may wish to take temporary exclusive possession of a permission token as will be described later.

The slave device 48 attempts to issue in turn all of its permission tokens out onto the communication circuitry and thus provide them to the master devices where they may be required. However, in a ring bus arrangement, communication slots (time periods) may already be occupied by permission tokens from other slave devices. Thus, for a given token communication slot, service level comparison circuitry 52 serves to compare the service level of any received permission token in that slot with the highest service level of any of the permission tokens stored within the buffer 50. If the buffer 50 is storing one or more permission tokens of a higher service level, then the received permission token from another slave device which has been subject the comparison by the circuitry 52 may be removed from the token bus and buffered within the buffer 50 thereby freeing a communication slot for use by one of the permission tokens stored within the buffer 50. The captured permission token will circulate to the top of the buffer 50 and accordingly in due course will be issued out onto the token bus. A multiplexer 54 serves to select either a permission token which is being passed through the slave device 48 or a permission token which is being output from the buffer 50.

The operation of the slave device 48 is to issue its permission tokens out to the system where they may be subject to temporary exclusive capture and possession by master devices. A ring bus topology for the token bus ensures that whenever any given master device relinquishes a permission token, it will be passed to the next device in turn and accordingly will reach all of the master devices connected to the token bus when a complete circuit of the token bus is made. Thus, each master device will be guaranteed an opportunity to take possession of the permission token if it has the required master service level at that time.

Figure 5:
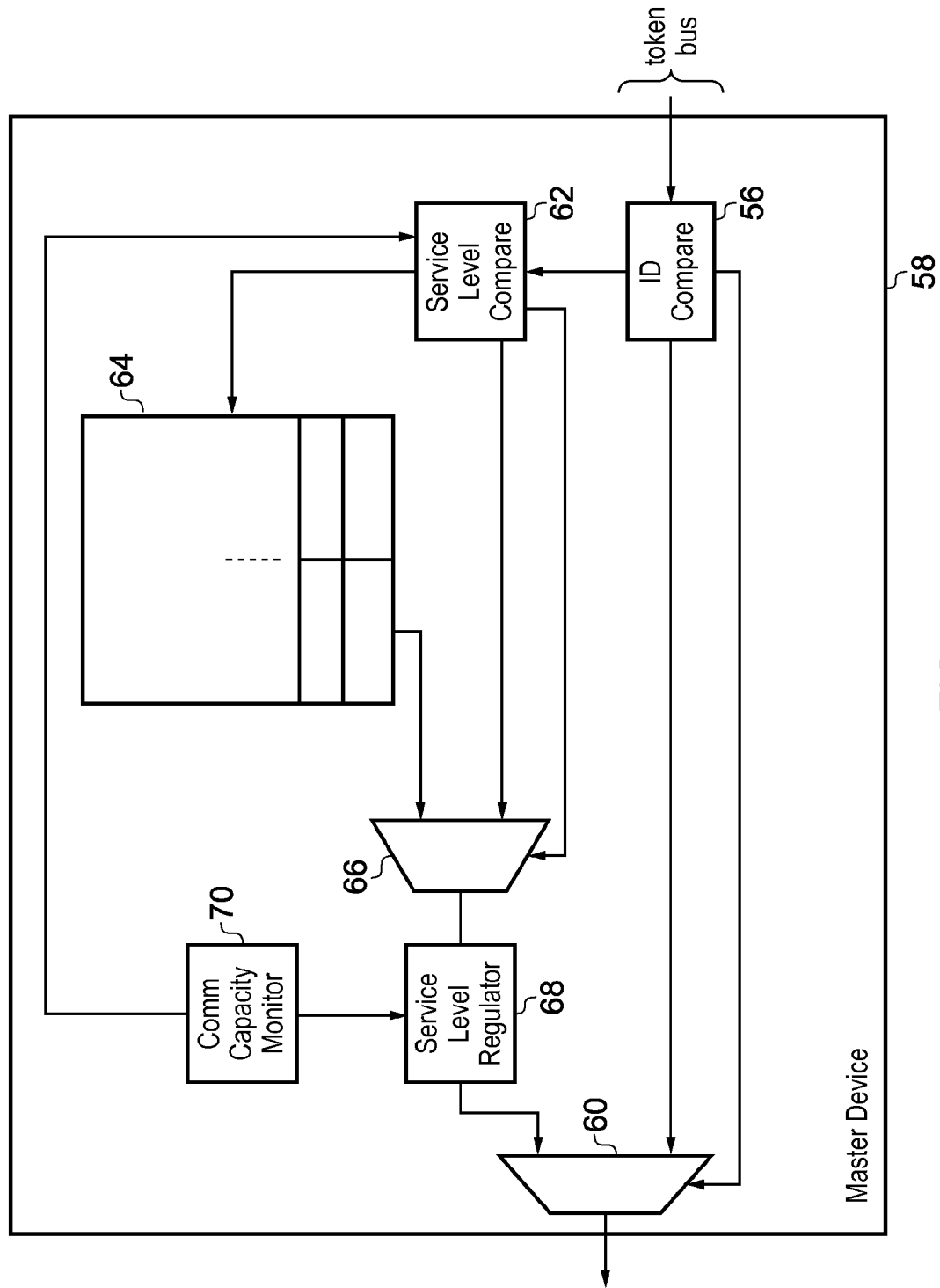
FIG. 5 schematically illustrates a master device with circuitry for receiving, taking temporary exclusive possession of and relinquishing permission tokens.

FIG. 5 schematically illustrates a master device including circuitry for taking temporary exclusive possession of permission tokens and for relinquishing permission tokens. ID comparison circuitry 56 compares the slave identifier ID of a received permission token with the slave identifiers of all messages that the master device 58 wishes to initiate. If there is no match, then the permission token is passed through via the multiplexer 60 to the next device upon the token ring bus. If there is a match, then this indicates that the master device 58 has a need for a permission token for the slave device concerned. Service level comparison circuitry 62 then compares the token service level for the received permission token with the service level of the master device at that point in time. This is the master service level. If the master service level is sufficiently high, then this indicates it has permission to take temporary exclusive possession of the permission token and so the permission token will be buffered within buffer 64. If the service level comparison indicates that the master device 58 does not have a sufficiently high master service level, then the permission token is passed on via multiplexer 66 and a service level regulator 68 to the token bus where it may then reach other devices.

When the master device 58 has completed a message it wishes to send to a slave device, and for which it took temporary exclusive possession of a permission token of that slave device, then the permission token is relinquished. The permission token is removed from the buffer 64 and passed via the multiplexer 66 and the service level regulator 68 out to the token bus. Communication capacity monitoring circuitry 70 serves to monitor whether or not the master device 58 is having its communication requirements with each slave device met. If the communication requirements are not being met, then this indicates that the master device 58 is being at least partially starved of communication capacity. In this case, the detection of such insufficient capacity is used to provide a control signal to the service level regulating circuitry 68 which serves to increase the service level associated with the permission token being relinquished and passed back onto the token bus. Increasing the service level of the permission token being relinquished decreases the likelihood that another master device will be able to take temporary possession of that permission token and thereby increases the likelihood that the master device 58 will be able to recapture that permission token in due course. This will increase the communication capacity provided to the master device 58. At the same time as increasing the service level associated with a permission token being relinquished, the communication capacity monitoring circuitry 70 may trigger the service level comparison circuitry 62 to note a currently higher master service level for the master device 58. In a similar way, increasing the service level of the master device 58 increases the likelihood that the master device 58 will be able to capture permission tokens and thereby increase its access to communication capacity.

If the communication capacity monitoring circuitry 70 indicates that the master device 58 is currently being provided with an excess of communication capacity, then complementary adjustments may be made with the service level of a permission token being relinquished and the master service level associated with the master device 58. Decreasing the token service level of a permission token being relinquished increases the likelihood that another slave device will be able to capture that permission token. In a similar way, decreasing the master service level of the master device 58 decreases the likelihood that the master device 58 will be able to capture permission tokens and thereby increases the availability of those permission tokens to other master devices.

Figure 6:
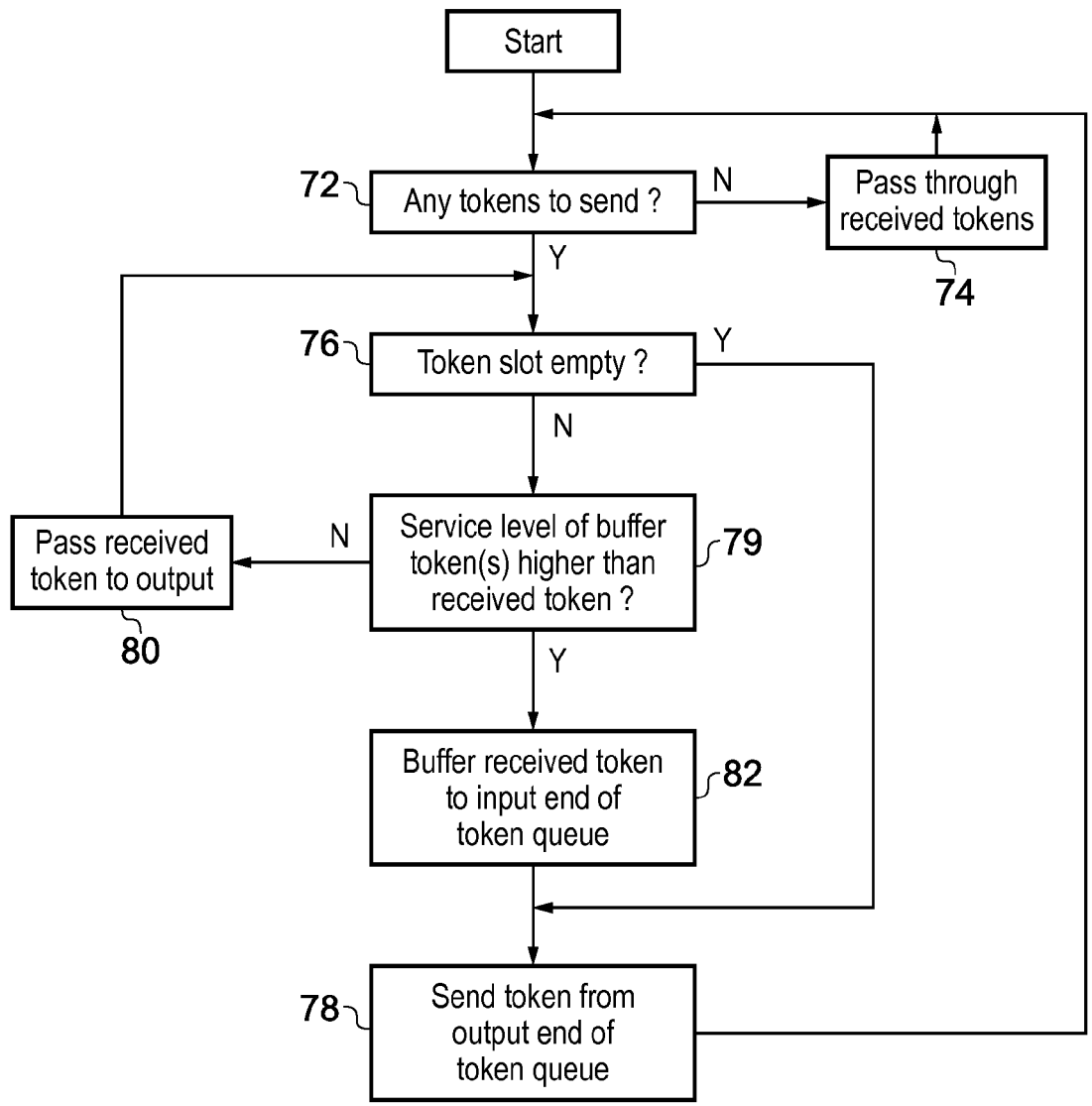
FIG. 6 is a flow diagram schematically illustrating token transmission by slave device.

FIG. 6 is a flow diagram schematically illustrating the process of slave token transmission. At step 72 the slave device determines whether or not it has any permission tokens to be sent out via the communication circuitry to master devices. If the slave device has no permission tokens to send, then step 74 serves to pass through any received permission tokens at the slave device without replacing them with its own permission tokens.

If the determination at step 72 is that the slave device does have permission tokens to send out, then step 76 determines whether or not a communication slot for a permission token is currently empty. If there is an empty slot, then step 78 sends out a permission token from the output end of the token queue (buffer) of the slave device. If there is not an empty token slot, then step 79 determines whether the service level of any of the tokens currently being held by the slave device is higher than the service level of the permission token currently occupying the communication slot concerned. It will be appreciated that service level in this example embodiment is one form of service type and more generally step 79 could be considered as "replacement of token allowed by service type". If the current occupant of the communication slot has a higher service level, then processing proceeds to step 80 and that permission token is passed through. If the service level of the buffered tokens within the slave device is higher than the service level of the received permission token, then processing proceeds to step 82 where the receive permission token is placed into the buffer of the slave device at its input end so as to release the communication slot concerned such that a token taken from the output end of the token queue of the slave device may be sent out in that communication slot. The capture of the permission token of a lower service level does not permanently remove that permission token from the system as it will circulate up to the top of the token queue within the slave device and then be sent out at a later time.

Figure 7:
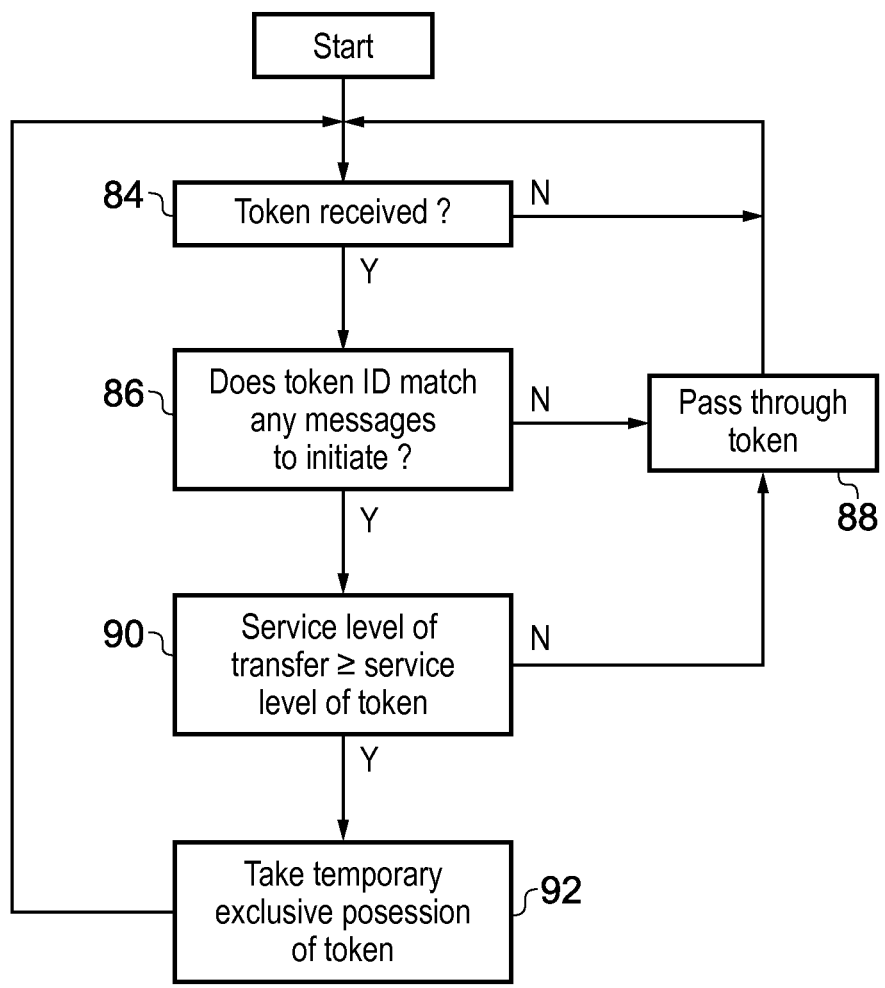
FIG. 7 is a flow diagram schematically illustrating token capture by master device.

FIG. 7 is a flow diagram schematically illustrating token capture at a master device. Processing waits at step 84 for a token to be received. When a token is received, then step 86 determines whether the slave identifier for that token matches the slave identifier associated with any messages which the master device concerned is waiting to initiate. If there is no match, then processing passes to step 88 where the token can be passed through and on to the next device on the communication circuitry.

If the comparison at step 86 indicates that the slave identifier matches a message to be initiated, then step 90 determines whether or not the service level of the master is greater than or equal to the service level of the token indicating that the master has sufficient priority (quality of service requirements, communication class characteristics, etc) to take possession of the permission token concerned. If the master does have a sufficiently high service level, then step 92 serves to take possession of the token. If the master does not have a sufficiently high service level, then processing passes from step 90 to step 88 where the permission token is again passed through without the master device having taken temporary exclusive possession of that permission token.

Figure 8:
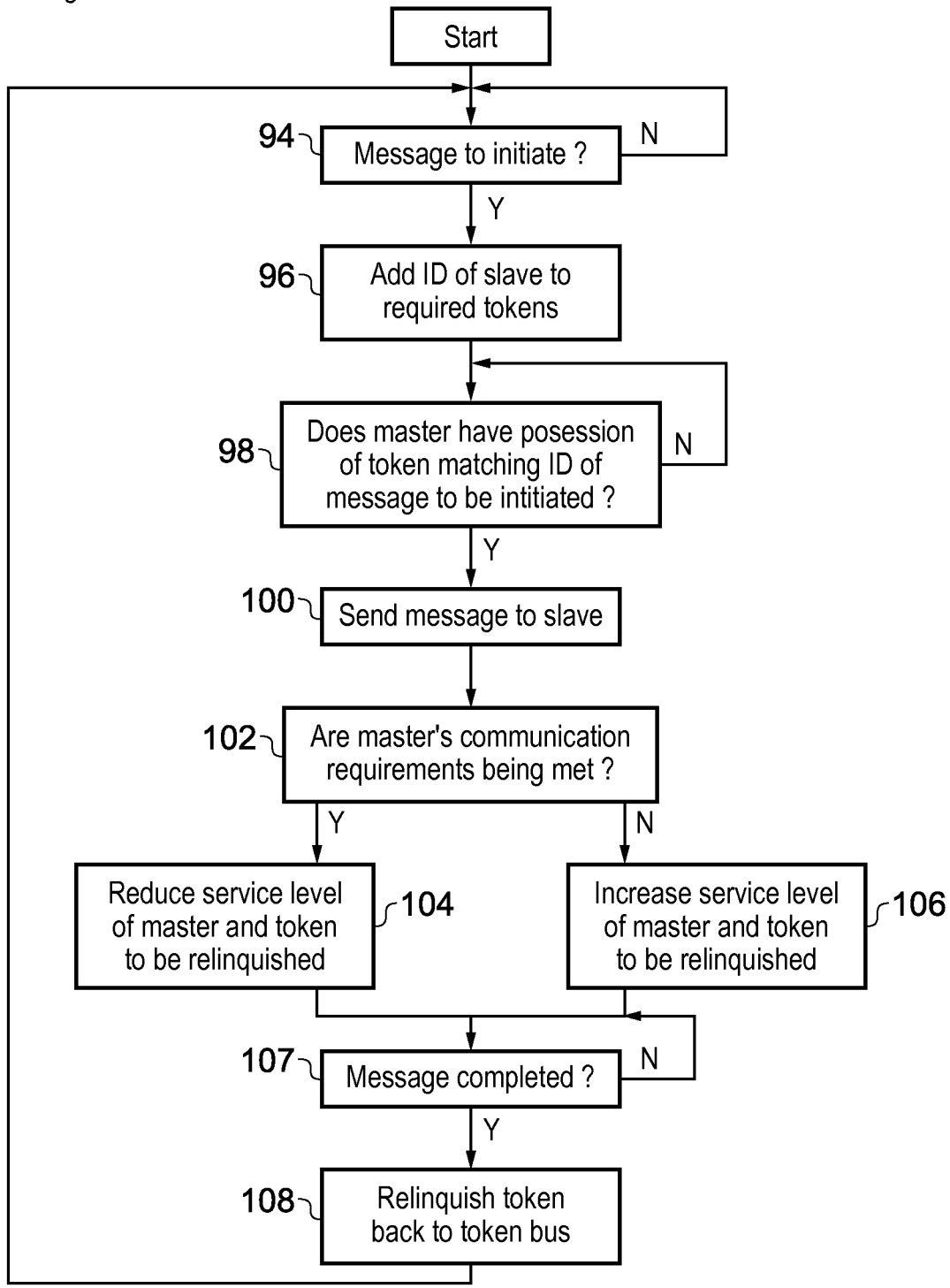
FIG. 8 is a flow diagram schematically illustrating the control of message issue by a master device.

FIG. 8 is a flow diagram schematically illustrating control of the sending of messages within a master device. At step 94 processing waits until the master device has a message to send. When the master has a message to send, then step 96 serves to add the slave identifier of the destination for the message to a list of slave identifiers for which the master device requires to capture permission tokens (see step 86 in FIG. 7). At step 98 processing waits until the master device obtains temporary exclusive possession of a permission token matching the slave identifier of the message to be initiated. When the master device has obtained temporary exclusive possession of a matching permission token, then step 100 serves to send the message concerned to the slave device. Possession of the appropriate permission token effectively guarantees that the slave device will have the capacity/ability to accept that message from the communication circuitry thereby avoiding any requirement to retransmit the message or any blocking effect on the data bus/interconnect which may arise through messages not being accepted.

Step 102 determines whether or not the master's communication requirements are currently being met. If the master's communication requirements are currently being met, then step 104 serves to reduce the service level of the master and the service level of the token to be relinquished. Conversely, if the communication requirements of the master are not currently being met, then step 106 serves to increase the service level of the master and increase the service level of the token to be relinquished. After the message has completed as determined at step 107, step 108 then relinquishes the token back to the token bus where it may pass to other devices, including other master devices and the originating slave device.

Figure 9:
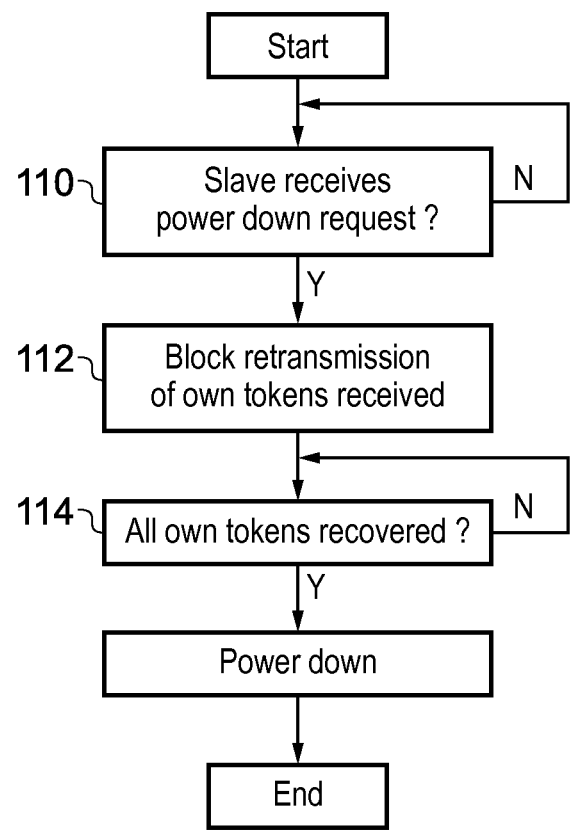
FIG. 9 is a flow diagram schematically illustrating the control of a power down operation within a slave device.

FIG. 9 is a flow diagram schematically illustrating the control of power down of a slave device. At step 110 the slave device waits until it receives a power down request. When a power down request has been received, step 112 serves to block the retransmission by the slave device of its own permission tokens when these are received back at the slave device. Accordingly, the slave device will gradually collect back all of its permission tokens which are currently in use elsewhere within the system. Step 114 waits until the slave device detects that it has received back all of its permission tokens. At this point, none of the master devices can be holding a permission token for that slave and accordingly (with a suitable timing window) it may be guaranteed that no messages are currently being sent to the slave device and the slave device may be safely powered down.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Apparatus for processing data, said apparatus comprising:
    a master device configured to initiate messages;
    a slave device configured to respond to messages received from said master device; and
    communication circuitry configured to provide communication of messages between said master device and said slave device; wherein
    said slave device is associated with a predetermined number permission tokens, said predetermined number of permission tokens being equal to a maximum number of concurrently pending messages that can be accepted for processing from said communication circuitry by said slave device under control of said permission tokens;
    said slave device is configured to transmit said permission tokens to said master device via said communication circuitry;
    said master device is configured to take exclusive temporary possession of a permission token received via said communication circuitry such that said permission token is no longer available for possession by any other master device;
    said master device is configured to initiate a message to said slave device only when said master device has said exclusive temporary possession of said permission token; and
    said master device is configured to relinquish said exclusive temporary possession of said permission token after said message has been completed.

2. Apparatus as claimed in claim 1, wherein each of said permission tokens has a respective token service type, said master device has a master service type and said master device is configured to compare a token service type of a received permission token with said master service type and to take exclusive temporary possession of said received permission token if said master service level indicates appropriate attributes relative to said token service level.

3. Apparatus as claimed in claim 2, wherein said master device is configured to monitor if sufficient communication capacity is provided between said master device and said slave device and, if insufficient communication capacity is provided, then to change to indicate a higher priority service type said master service type and a token service type of a permission token relinquished by said master device.

4. Apparatus as claimed in claim 3, wherein said master device is configured to monitor if an excess of communication capacity is provided between said master device and said slave device and, if an excess of communication capacity is provided, then to change to indicate a lower priority service type said master service type and a token service type of a permission token relinquished by said master device.

5. Apparatus as claimed in claim 1, wherein each of said permission tokens includes a slave identifier identifying said slave device and said master device is configured to detect from a slave identifier of a received permission token whether or not said master device has a message to initiate with said slave device and to take exclusive temporary possession of said received permission token if said master device has a message to initiate with said slave device.

6. Apparatus as claimed in claim 1, wherein said communications circuitry is configured to return said permission tokens issued by said slave device back to said slave device to be reissued to said master device.

7. Apparatus as claimed in claim 6, wherein said slave device is configured to respond to a power down request to stop reissuing said permission tokens and to enter a power down state only after all of said permissions tokens for said slave device have been received back at said slave device.

8. Apparatus as claimed in claim 1, comprising another slave device and wherein said slave device is configured receive from said communication circuitry a different slave permission token issued by said another slave device, to take temporary exclusive possession of said different slave permission token and to transmit to said master device, in place of said different slave permission token, a permission token of said slave device.

9. Apparatus as claimed in claim 8, wherein said slave device buffers said different slave permission token and transmits said different slave permission token to said master device at a later time.

10. Apparatus as claimed in claim 1, wherein said communication circuitry includes a token interconnect having a ring topology for transmitting said permission tokens with said master device and said slave device connected to different points on said token interconnect such that said permission tokens circulate around said token interconnect to reach all devices connected to said token interconnect in turn.

11. Apparatus as claimed in claim 1, wherein said communication circuitry includes a token star bus having a star topology for transmitting said permission tokens with said master device and said slave device connected to different points on said star bus such that said permission tokens are transmitted in turn to all master devices connected to said star bus.

12. Apparatus as claimed in claim 1, wherein said communication circuitry includes a data interconnect having a ring topology for transmitting said messages.

13. Apparatus as claimed in claim 1, wherein communication circuitry includes a data bus for transmitting said messages and having a topology independent of a topology of a bus used for transmitting data permission tokens.

14. Apparatus as claimed in claim 1, comprising a plurality of master devices connected to said communication circuitry.

15. Apparatus as claimed in claim 1, comprising a plurality of slave devices connected to said communication circuitry.

16. Apparatus as claimed in claim 1, wherein a device connected to said communication circuitry can function in a first mode as a master device and in a second mode as a slave device.

17. Apparatus as claimed in claim 1, wherein said master device is a bridge device for relaying messages to said slave device.

18. Apparatus for processing data, said apparatus comprising:
    master means for initiating messages;
    slave means for responding to messages received from said master means; and
    communication means for providing communication of messages between said master means and said slave means; wherein
    said slave means is associated with a predetermined number permission tokens, said predetermined number of permission tokens being equal to a maximum number of concurrently pending messages that can be accepted for processing from said communication means by said slave means under control of said permission tokens;
    said slave means transmits said permission tokens to said master means via said communication means;
    said master means takes exclusive temporary possession of a permission token received via said communication means such that said permission token is no longer available for possession by any other master means;
    said master means initiates a message to said slave means only when said master means has said exclusive temporary possession of said permission token; and
    said master means relinquishes said exclusive temporary possession of said permission token after said message has been completed.

19. A method of processing data, said method comprising the steps of:
    initiating messages with a master device;
    responding with a slave device to messages received from said master device; and
    providing communication of messages via communication circuitry between said master means and said slave means; wherein
    said slave device is associated with a predetermined number permission tokens, said predetermined number of permission tokens being equal to a maximum number of concurrently pending messages that can be accepted for processing from said communication circuitry by said slave device under control of said permission tokens;
    said slave device transmits said permission tokens to said master device via said communication circuitry;
    said master device takes exclusive temporary possession of a permission token received via said communication circuitry such that said permission token is no longer available for possession by any other master devices;
    said master device initiates a message to said slave device only when said master device has said exclusive temporary possession of said permission token; and
    said master device relinquishes said exclusive temporary possession of said permission token after said message has been completed.

* * * * *